(12) United States Patent
Gersht et al.

(10) Patent No.: US 11,816,074 B2
(45) Date of Patent: Nov. 14, 2023

(54) SHARING OF WEB APPLICATION IN DEVELOPMENT VIA INSTANT MESSAGING APPLICATION

(71) Applicant: Red Hat, Inc., Raleigh, NC (US)

(72) Inventors: Ilan Gersht, Bat Yam (IL); Arie Bregman, Gan Yavne (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/448,602

(22) Filed: Sep. 23, 2021

(65) Prior Publication Data

US 2023/0088220 A1  Mar. 23, 2023

(51) Int. Cl.
*G06F 16/18* (2019.01)
*H04L 51/046* (2022.01)
*G06F 16/955* (2019.01)

(52) U.S. Cl.
CPC ........ *G06F 16/1873* (2019.01); *G06F 16/955* (2019.01); *H04L 51/046* (2013.01)

(58) Field of Classification Search
CPC ... G06F 16/1873; G06F 16/955; H04L 51/046
See application file for complete search history.

(56) References Cited

U.S. PATENT DOCUMENTS

| | | | |
|---|---|---|---|
| 8,060,855 B2 | 11/2011 | Hegde et al. | |
| 8,756,519 B2 | 6/2014 | Hunt et al. | |
| 9,092,298 B2 | 7/2015 | Lerum et al. | |
| 9,858,070 B2 | 1/2018 | DeLuca et al. | |
| 10,084,729 B2 | 9/2018 | Wang et al. | |
| 10,409,562 B2 | 9/2019 | Leonelli et al. | |
| 11,050,789 B2 * | 6/2021 | Verma | H04L 63/1416 |
| 11,537,400 B1 * | 12/2022 | Zhang | G06F 8/51 |
| 2007/0094735 A1 * | 4/2007 | Cohen | H04L 63/168 |
| | | | 713/188 |
| 2010/0070899 A1 * | 3/2010 | Hunt | G06F 3/0486 |
| | | | 709/204 |

OTHER PUBLICATIONS

Hupfer, S. et al., "Introducing Collaboration into an Application Development Environment", https://www.researchgate.net/porfile/Steven-Ross-23/publication/220879383_Introducing_collaboration_into-an_application_development_environment/links/544514820cf2dccf30b812aa/Introducing-collaboration-into-an-application-development-environment.pdf., Nov. 6-10, 2004, 6 pages.

* cited by examiner

*Primary Examiner* — Huawen A Peng
(74) *Attorney, Agent, or Firm* — LOWENSTEIN SANDLER LLP (57) ABSTRACT

Systems and methods for virtual image testing. An example method may comprise receiving, by a messaging application, an identifier of a file residing a file system. Configuring a file serving process to respond to content requests specifying the file. Transmitting, by the messaging application, a notification comprising a uniform resource locator derived from the file identifier.

20 Claims, 5 Drawing Sheets

SHARING OF WEB APPLICATION IN DEVELOPMENT VIA INSTANT MESSAGING APPLICATION

TECHNICAL FIELD

The present disclosure is generally related to computer systems, and more particularly, to sharing of web application in development via instant messaging application.

BACKGROUND

Web applications are software applications that runs on web servers accessible by users through a web browser. Typically, web application development uses client-side and server-side programming to develop an application accessible over a web browser. Developers begin with conceptualizing a web application, to designing the web application, to choosing and applying a framework for developing the web application, to testing the web application, and finally to deploying the web application. In some instances, web application development is performed by a development team that can include a cross-functional team of individuals who collectively are responsible for the development of the web application. Development teams are often distributed among various locations and due to a growing complexity of web development, communication between individuals of the development team has become more crucial.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for sharing web applications via instant messaging (IM) application. For example, the methods and systems can be utilized to share web applications in development via IM applications. Examples of the present disclosure refer to instant messaging for simplicity. However, the disclosure may be applicable to other forms of instant communication. A web application in development may be a web application in any stage of development. IM applications may be any communication based technology that facilitates instant communication between two or more participants over the internet or other types of networks.

Typically, during the web application development, communication between individuals of the development team need to be immediate. Accordingly, a common tool used by development teams to maintain communication and a cohesive and efficient team environment are instant messaging (IM) applications. IM applications provide online chat that offers real-time communication over the Internet. IM applications has facilitated instant communication and collaboration between individuals of the development teams. In certain implementations, sharing draft web applications through IM applications requires the sender to deploy an environment to install and execute the draft web application and provide to the receiver(s) access to the environment with the running draft web application. The receiver(s) may receive from the sender a uniform resource locator (URL) link or Internet Protocol (IP) address directed to the environment with the running draft web application. Environments can include virtual machines, cloud environments, local machine, or any virtual environment suitable to install and execute a web application. Accordingly, the sender chooses and deploys an environment suitable for the draft application. Once deployed, the sender may install any packages, libraries, web services or servers, and any other requirements necessary to run the draft web application in the chosen environment. In some instances, when the chosen environment is a virtual machine, a virtual environment, or a cloud, the sender can further configure additional security measures, such as, firewalls, to ensure that only the sender and the receiver(s) have access to the chosen environment running the draft web application.

In some instances, if the sender updates the draft web applications for any reason during the development lifecycle, such as, implementing feedback from the receiver(s), re-installation of the updated draft web application in the chosen environment is required in order to share the updated web application with the receiver(s). In extreme cases, based on the degree of change from the original draft web application running on the chosen environment, a new environment and new packages, libraries, web services or servers may be required, thus requiring the whole process to be repeated in order to share the updated draft web application with the receiver(s). Once the environment has changed, the sender must share a new link to the new environment running the updated draft web application. Accordingly, the process of sharing a draft web application is tedious and cumbersome to the sender especially during the development lifecycle.

Aspects of the present disclosure address the above-noted and other deficiencies by providing technology that reduces the cumbersome process of sharing a draft web application with receivers through instant messaging applications. In particular, aspects of the present disclosure provide a web application owner (e.g., a developer working on a draft web application) with two modes of sharing the draft web application via an instant messaging application. In one embodiment, based on the selected sharing option, the instant messaging application can automatically deploy, install, and run the draft web application on the local machine of the sender and provide the receiver(s) access to the draft web application running on the local machine of the sender. In another embodiment, based on the selected sharing option, the instant messaging application can automatically deploy, install, and run the draft web application on a server of the instant messaging application and provide the sender and the receiver(s) access to the draft web application located on the web server of the instant messaging application. Upon deployment, installation, and running of the draft web application, the sender may further specify how the instant messaging application shares the draft web application, for example, whether to share a dynamic version of the draft web application (e.g., draft web application with working services) or a static version of the web application (e.g., one or more static HTML pages representing a snapshot of the draft web application) to the receiver(s). Accordingly, by permitting the instant messaging application to share the draft web application with minimal interaction by the sender, the tedious and cumbersome process of deploying, installing, and running the draft web application by the sender is reduced and thereby improving efficiency in the development lifecycle of web application.

Various aspects of the above referenced methods and systems are described in details herein below by way of examples, rather than by way of limitation. The examples provided below discuss deploying, installing, running, and sharing of the draft web application may be performed by aspects of an instant messaging application, a host operating system, a virtual machine, or a combination thereof. In other examples, deploying, installing, running, and sharing of draft web applications may be performed in any suitable computer system that is absent of instant messaging application, host operating system, virtual machine discussed below.

Figure 1:
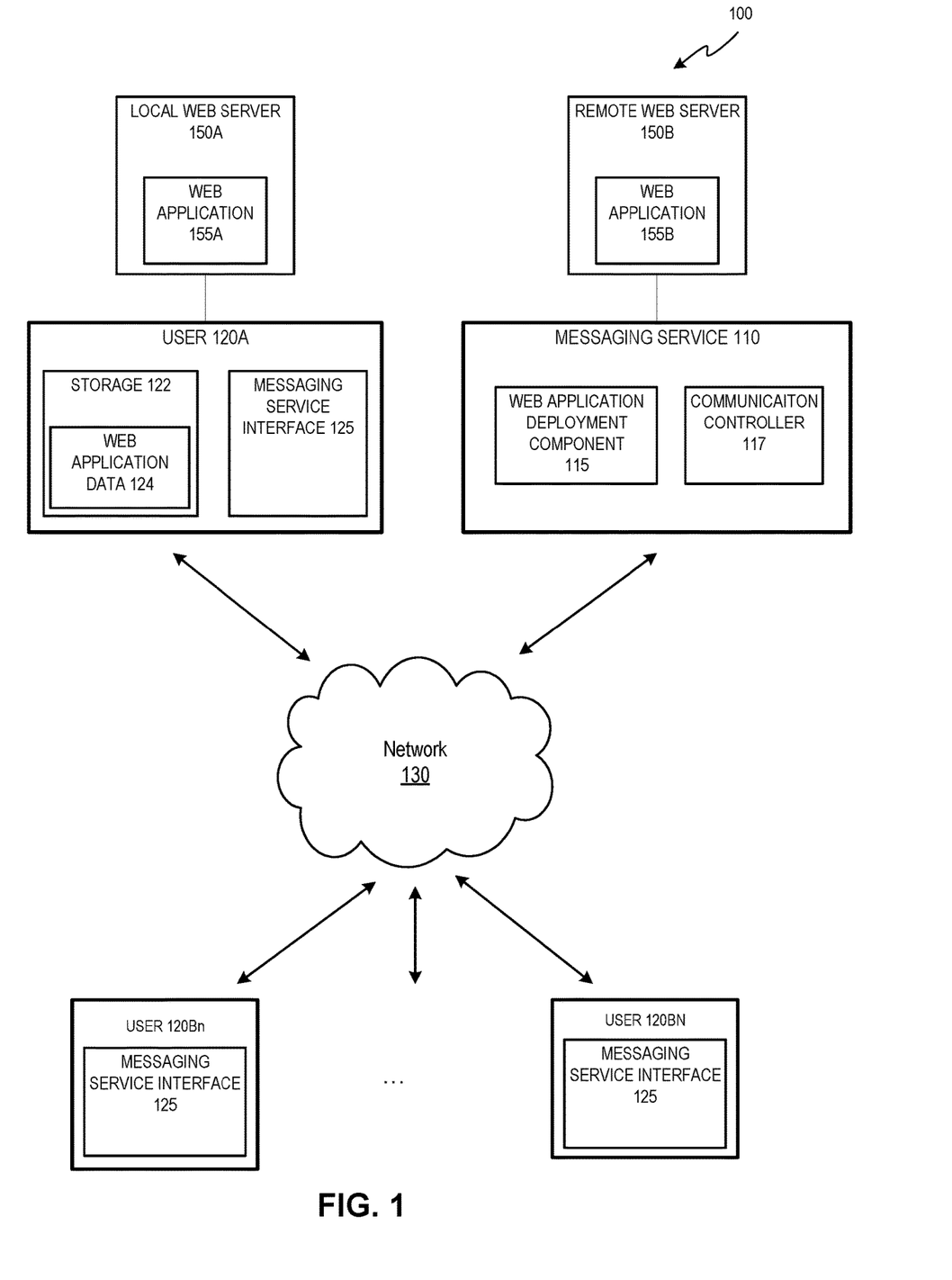
FIG. 1 depicts an exemplary system for sharing of a web application in development via instant messaging application, in accordance with one or more aspects of the present disclosure.

FIG. 1 depicts an illustrative architecture of elements of a system 100, in accordance with an embodiment of the present disclosure. As shown, the system may comprise one or more users (e.g., clients 120A and clients 120Bn-BN), a messaging service 110, and a network 130. In general, system 100 may be implemented on a widely available data network, such as the Internet. For example, system 100 enables the plurality of users (e.g., clients 120A and clients 120Bn-BN) to communicate with one another over the network 130 via the messaging service 110.

Messaging service 110 may include a communication controller 117 that facilitates instant communication between the plurality of users (e.g., users 120A and clients 120Bn-BN) over network 130 or other types of networks. The communication controller 117 can facilitates instant communication between the plurality of users by receiving packets of data from a messaging service interface located on the plurality of users and directing the received packets of data to the appropriate user of the plurality of users. In some embodiments, a plurality of users may establish a communication session with one another and send and receive packets of data from between the plurality of users in the established communication session, thereby, bypassing interacting with the communication controller 117 (e.g., peer-to-peer messaging). The packet of data can include a header, which can specify the origin of the packet of data and the designated receiver of the packet of data. The payload of the packet can include the desired data to be sent to the destination. Messaging service 110 can deploy a web ("HTTP") server (e.g., remote web server 150B) to facilitate access to web pages or web applications (e.g., web application 155B). Accordingly, to access the web page or web application, the messaging service 110 provides a URL link corresponding to web application 155B.

Client 120A and clients 120Bn-BN can be computing devices such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

Clients 120A and clients 120Bn-BN, as described previously, can include a messaging service interface 125 coupled to the communication controller 117, in which the messaging service interface 125 can facilitate interaction between users of system 100 through a user interface of the client. Clients 120A (e.g., developer) further includes a storage 122 that can store files associated with the web application in development, such as, web application data 124. Storage 122 may be a physical memory and may include volatile memory devices (e.g., random access memory (RAM)), non-volatile memory devices (e.g., flash memory, NVRAM), and/or other types of memory devices or one or more mass storage devices, such as hard drives, solid state drives (SSD)), other data storage devices, or a combination thereof.

The web application data 124 refers to data and/or resources requirements needed to execute and run a web application. The data can include web application source code, web application framework, databases, libraries, and any other information necessary to develop and run a web application. The web application source code refers to source code of a web application developed by a user. Web source code can be, for example, Cascading Style Sheets, HyperText Markup Language, Javascript, Java, HTML5, or any other suitable coding language for web application development. Web application framework refers to a software framework that is designed to support the development of web applications including web services, web resources, and web APIs. Web application frameworks can be, for example, Angular, React, Vue, Ember, or Svelte.

Clients 120A can further deploy a web server (e.g., local web server 150A) to facilitate access to web pages or web applications (e.g., web application 155A). Depending on the embodiment, web application 155A is derived from web application data 124. Accordingly, to access the web page or web application 155A, the clients 120A provides a URL link corresponding to web application 155A to clients 120Bn-BN. In some embodiments, other users, for example, clients 120Bn-BN clients 120Bn-BN may include a storage with web application data. Accordingly, each user of clients 120Bn-BN clients 120Bn-BN can deploy a web server based on web application data stored in a storage of clients 120Bn-BN clients 120Bn-BN to facilitate access to web pages or web applications.

Network 130 may comprise one or more networks, such as a local area network, the Internet, or other type of wide area network. In addition, network 130 may support a wide variety of known protocols, such as the transport control protocol and Internet protocol ("TCP/IP") and hypertext transport protocol ("HTTP").

Messaging service 110 may further include a web application deployment component 115 that can facilitate deployment of web servers to install and run web applications based on a file path of the web application data shared via the messaging service 110. In some embodiments, the web application data stored at the file path may be shared directly to the messaging service 110, instead of the messaging service 110 obtaining the web application data from the file path. The communication controller 117 receives a packet of data from a sender (e.g., clients 120A) directed to at least one client of client 120Bn-BN ("the receiver"), in which the packet of data is a request to share a web application with the receiver based on file path of the web application data or web application data of the sender (e.g., web application data 124). The web application deployment component 115 deploys a local web server 150A or a remote web server 150B based on payload of the packet of data received by the communication controller 117. The payload can indicate whether the sender would like for the web application deployment component 115 to set up the web application associated with the web application data on the sender's environment or the messaging service's environment.

Accordingly, when the payload indicates that the web application should be set up on the sender's environment, the web application deployment component 115 request permission to access the file path of the web application data, web application data, and the sender's environment to deploy local web server 150A and based on the web application data 124 install packages, libraries, web services, and any other requirements necessary to run the web application associated with the web application data. Once the local web server 150A is deployed, web application deployment component 115, based on the payload of the packet of data received by the communication controller 117 from the sender, implements a security protocol (e.g., by specifying firewall configuration rules) permitting access to the local web server 150A to the designated receiver of the packet of data. The web application deployment component 115 further installs the web application associated with the web application data 124 on the local web server 150A. Once the web application associated with the web application data 124 is installed, the web application deployment component 115 provides the communication controller 117 with a URL corresponding to the local web server 150A to be shared with the designated receiver of the packet of data.

The web application deployment component 115, when the payload indicates that the web application should be set up on the messaging service's environment, deploys a remote web server 150B and based on the web application data 124 install packages, libraries, web services, and any other requirements necessary to run the web application associated with the web application data. Once the remote web server 150B is deployed, web application deployment component 115, based on the payload of the packet of data received by the communication controller 117 from the sender, implements a security protocol (e.g., by specifying firewall configuration rules) permitting access to the remote web server 150B to the sender of the packet of data and the designated receiver of the packet of data. The web application deployment component 115 further installs the web application associated with the web application data 124 on the remote web server 150B. To install the web application associated with the web application data 124 on the remote web server 150B, for example, the web application deployment component 115 copies all the web application data 124 to a directory associated with the remote web server 150B. Once copied, the web application deployment component 115 compiles and executes the web application data. Once the web application associated with the web application data 124 is installed, the web application deployment component 115 provides the communication controller 117 with a URL corresponding to the remote web server 150B to be shared with the sender of the packet of data and the designated receiver of the packet of data.

In some embodiments, the sender of the packet can indicate whether to share a static web application associated with the web application data 124 or a dynamic version of the web application associated with the web application data 124. Static web application refers to a web application that resembles the web application as developed but is unchangeable by the user or any third party services (i.e., a static HTML page showing a "snapshot" of the web application). For example, an output produced by JavaScript can be stored in a static HTML page. The output may be all the required information of the web application to be displayed on the HTML page. Dynamic web application refers to a web application that resembles the web application as developed and that is in communication with server-side (e.g., third party services) or client-side services in which servers and/or the user can interact with the web application.

Depending on the embodiment, to share the static web application, the web application deployment component 115 may determine a subset of the specific packages, libraries, web services and other requirements necessary for installation of a static web application, as oppose to a dynamic web application. Accordingly, the URL that is shared would be directed to a static web application rather than a dynamic web application. In some embodiments, to share the static web application, the web application deployment component 115 may determine that a web server is not needed and instead compile and/or render the web application data 124 and share a snapshot (e.g., screenshot) of the web application associated with the web application data 124.

Figure 2:
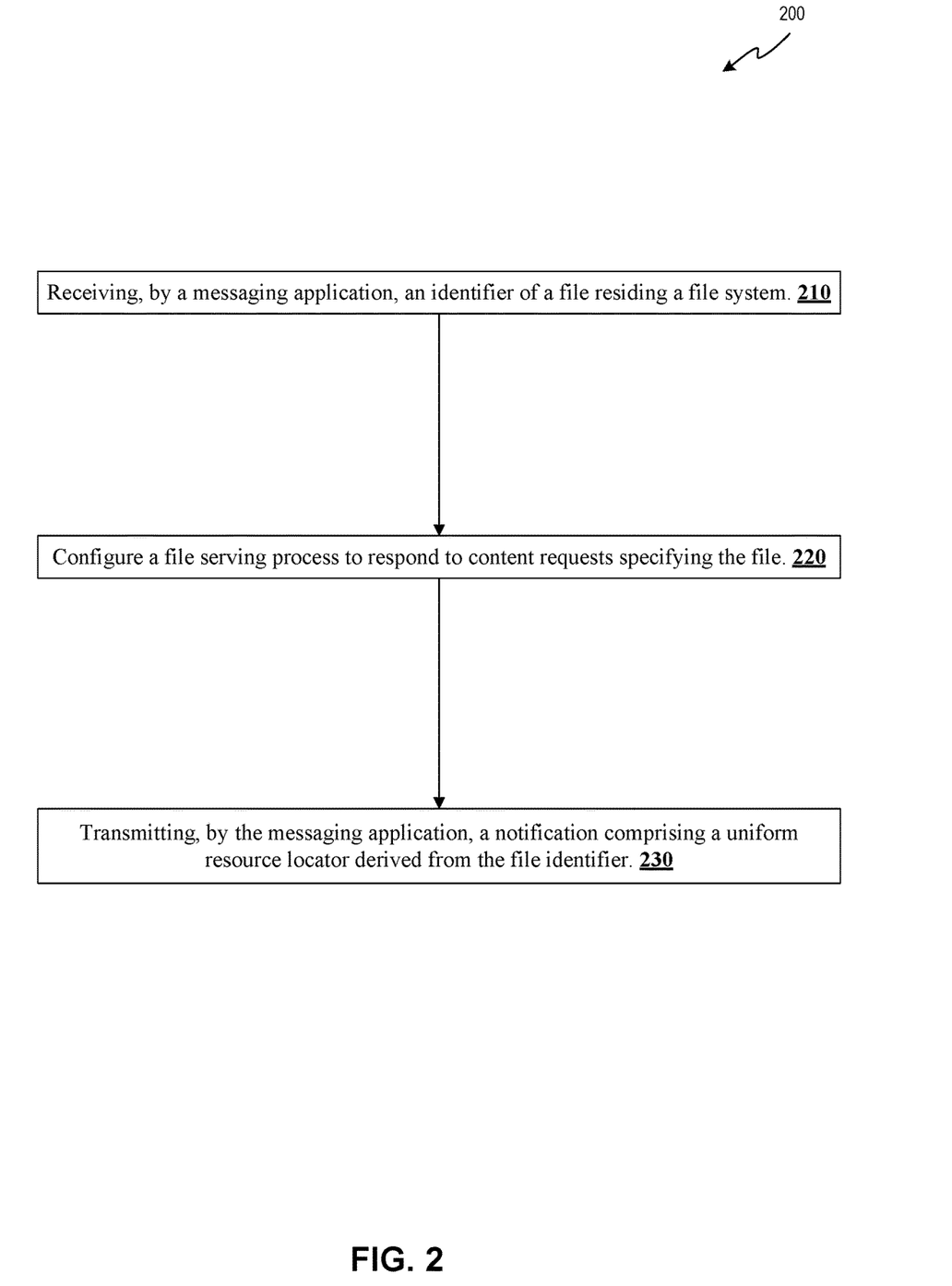
FIG. 2 depicts a flow diagram of an example method for sharing of a web application in development, in accordance with one or more aspects of the present disclosure.

FIG. 2 depicts a flow diagram of an illustrative example of a method 200 for sharing of a web application in development, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may be performed by processing devices of a server device or a client device and may begin at block 210.

At block 210, the processing device receives, by a messaging application, an identifier of a file residing on a file system. The file system is either a local file system or a remote file system associated with a host computer system. For example, the file system may be storage 122. In some embodiments, the identifier may be a file path directed to the location of the file residing on the file system.

At block 220, the processing device configures a file serving process (e.g., a server) to respond to content requests specifying the file. The file serving process is a HyperText Transfer Protocol (HTTP) server. To configure the file serving process (e.g., local web server 150A or remote web server 150B) further comprises at least one of: initializing the file serving process, installing at least one extension package for the file serving process, configuring an access permission by the file serving process, or installing a version of the file.

To initialize the file serving process, the processing device determines whether to initialize the file serving process on the host computer system or a system associated with the messaging application. As described previously, in some embodiments, to determine whether to initialize the file serving process on the host computer system or the system associated with the messaging application, the processing device analyzes the payload of the request which may include information that indicates whether the to set up the web application associated with the web application data on the sender's environment (e.g., local web server) or the messaging service's environment (e.g., remote web server).

To install at least one package on the file serving process, the processing device can obtain package information from the web application data (e.g., web application data 124) to determine at least one package of the file associated with the web application data. In some embodiments, to install at least one package on the file serving process, the processing device identifies the at least one package, by analyzing the file.

To install the file from the file serving process, the processing device determines based on a selected version of the web application (e.g., static mode or dynamic mode), whether to display a static version of the file (e.g., static web application) or a dynamic version of the file (e.g., dynamic web application). As described previously, a static web application refers to a web application that resembles the web application as developed but is unchangeable by the user or any third party services and a dynamic web application refers to a web application that resembles the web application as developed and that is in communication with server-side (e.g., third party services) or client-side services in which servers and/or the user can interact with the web application.

At block 230, the processing device transmits, by the messaging application, a notification comprising a uniform resource locator (URL) derived from the file identifier. In some embodiments, the URL is a host address and the identifier of the file. The host address references the host on which the file serving process is running.

Responsive to completing the operations described herein above with references to block 230, the method may terminate.

Figure 3:
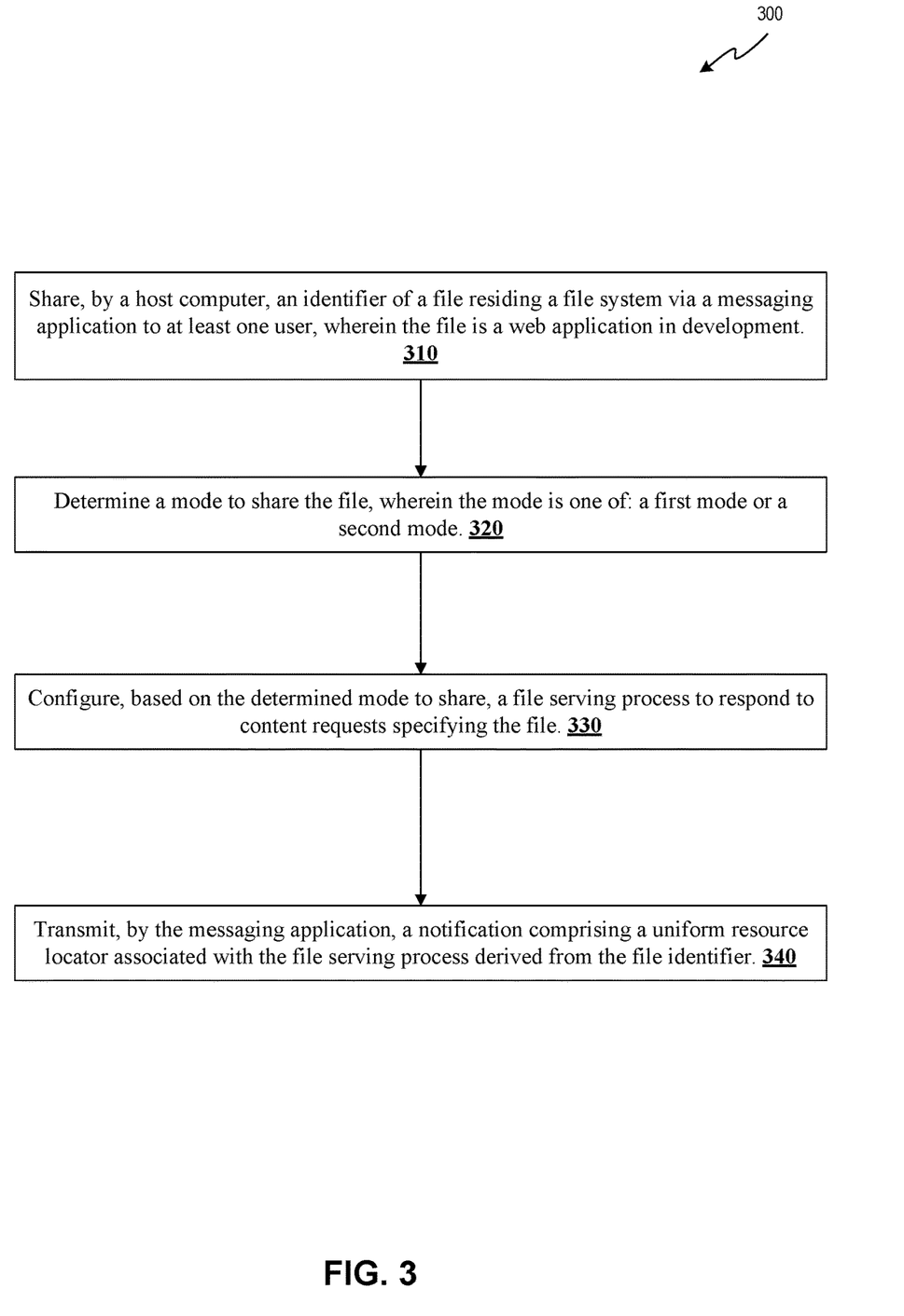
FIG. 3 depicts a flow diagram of an example method for sharing of a web application in development, in accordance with one or more aspects of the present disclosure.

FIG. 3 depicts a flow diagram of an illustrative example of a method 300 for sharing of a web application in development, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 300 may be performed by processing devices of a server device or a client device and may begin at block 310. At block 310, the processing device share, by a host computer, an identifier of a file residing a file system via a messaging application to at least one user, wherein the file is a web application in development.

At block 320, the processing device determine a mode to share the file, wherein the mode is one of: a first mode or a second mode. As described previously, in some embodiments, to determine which mode to share the file, the processing device analyzes the payload of the request which may include information that indicates whether the first mode corresponding to setting up the web application associated with the web application data on the sender's environment (e.g., local web server) was selected or whether the second mode corresponding to setting up the web application associated with the web application data on the messaging service's environment (e.g., remote web server) was selected.

At block 330, the processing device configure a file serving process to respond to content requests specifying the file. As noted above, the first mode refers to utilizing the host computer system to generate a web server to share the web application and the second mode refers to utilizing the messaging applications system to generate a web server to share the web application.

At block 340, the processing device configures, based on the determined mode to share, a file serving process to respond to content requests specifying the file. To configure the file serving process based on the first mode, the processing device initializes a HyperText Transfer Protocol (HTTP) server on the host computer. To configure the file serving process based on the second mode, the processing device initializes a HyperText Transfer Protocol (HTTP) server on the messaging application computer.

As described previously, to configure the file serving process (e.g., local web server 150A or remote web server 150B) may further comprises installing at least one package on the file serving process, configuring access permission to the file serving process, and installing the file on the file serving process.

As described previously, to install at least one package on the file serving process, the processing device can identify package information from the web application data (e.g., web application data 124) to determine at least one package of the file associated with the web application data by analyzing the file. Upon installation of the web application, the processing device determines based on a selected version of the web application (e.g., static mode or dynamic mode), whether to display a static version of the file (e.g., static web application) or a dynamic version of the file (e.g., dynamic web application). As described previously, a static web application refers to a web application that resembles the web application as developed but is unchangeable by the user or any third party services and a dynamic web application refers to a web application that resembles the web application as developed and that is in communication with server-side (e.g., third party services) or client-side services in which servers and/or the user can interact with the web application.

At block 350, the processing device transmits, by the messaging application, a notification comprising a uniform resource locator associated with the file serving process derived from the file identifier.

Responsive to completing the operations described herein above with references to block 350, the method may terminate.

Figure 4:
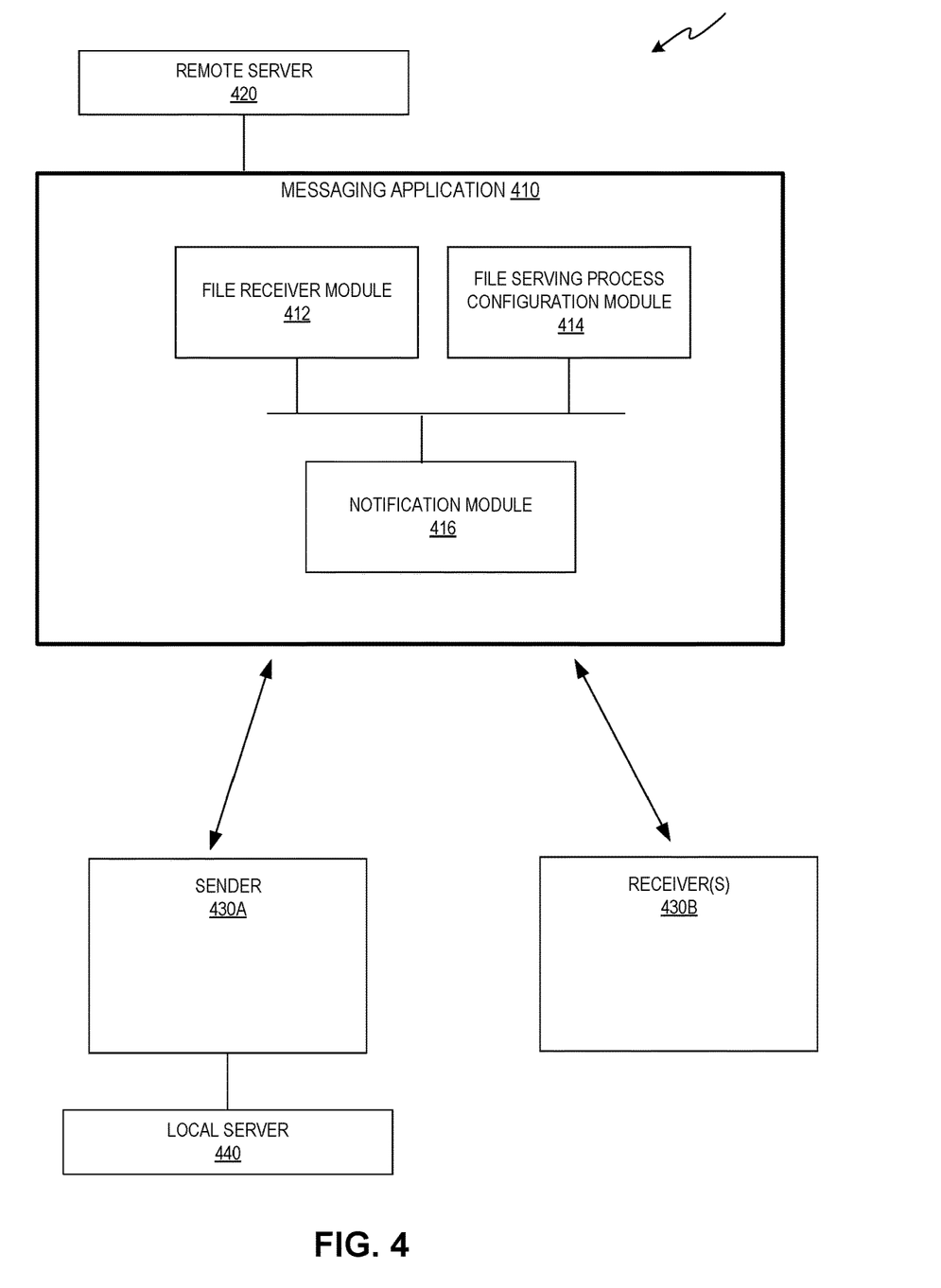
FIG. 4 depicts a block diagram of an example system in accordance with one or more aspects of the present disclosure.

FIG. 4 depicts a block diagram of a system 400 operating in accordance with one or more aspects of the present disclosure. System 400 may be the same or similar to the system 100 and may include one or more processing devices and one or more memory devices. In the example shown, system 400 may include a messaging application 410 comprising a file identifier receiver module 412, a file serving process configuration module 414, a notification module 416, a sender 430A, and a receiver 430B.

File identifier receiver module 412 may receive an identifier (e.g., file path) of a file residing on a storage (e.g., file system) of sender 430A. The file system is either a local file system or a remote file system associated with a host computer system. The file may be web application data (e.g., 124) associated with an application the sender is developing. In some instances the file identifier receiver module 412 may receive the file directly without accessing the file system. For example, the web application data stored at the file path may be shared directly to the messaging service 410, instead of the messaging service 410 obtaining the web application data from the file path.

File serving process configuration module 414 may configure a remote server 420 or a local server 440 to respond to content requests specifying the file. To configure the remote server 420 or local server 440, the file serving process processing module 420 may initialize the remote server 420 or local server 440. To initialize the remote server 420 or local server 440, the file serving process processing module 420 determines whether to initialize the remote server 420 or local server 440 based on a request from sender 430A. For example, the payload associated with the request may indicate whether the sender would like for the web application to be set up on the sender's environment (e.g., local server 440) or the messaging service's environment (e.g., remote server 420).

Once a server (e.g., the remote server 420 is requested) is initialized, the file serving process processing module 420 may install at least one package on the server (e.g., remote server 420). To install the at least one package on the server (e.g., remote server 420), the file serving process processing module 420 obtains package information from the file (e.g., web application data 124) which includes, for example, source code, framework, databases, libraries, and any other information necessary to develop and run a web application. Installing at least one package on the file serving process includes identifying the at least one package by analyzing the file.

Once the at least one package is installed on the server (e.g., remote server 420), the file serving process module 420 may configure access permission to the server (e.g., remote server 420). To configure access permission to the server (e.g., remote server 420), the file serving process module 420 determines based on the server whether to provide access to the sender and the receiver or just the receiver. For example, if the server is the remote server 420, the sender 430A would need access since the sender 430A does not have access to the remote server 420. Accordingly, the file serving process module 420 may provide the sender 430A access to the remote server 420 in addition to the receiver 430B. If the server is the local server 440, the sender does not need to be provided access since the sender 430A host the local server 440. Accordingly, the file serving process module 420 may provide access to the receiver 430B only.

Once permission is provided, the file serving process module 420 may install the file on the server (e.g., remote server 420). To install the file from the server (e.g., remote server 420), the file serving process module 420 may determine whether to provide a static version of the file (e.g., static web application) or a dynamic version of the file (e.g., dynamic web application). As described previously, a static web application refers to a web application that resembles the web application as developed but is unchangeable by the user or any third party services and a dynamic web application refers to a web application that resembles the web application as developed and that is in communication with server-side (e.g., third party services) or client-side services in which servers and/or the user can interact with the web application.

If the sender 430A selects the static version of the file, the file serving process module 420 may perform installation of certain aspects of the file (e.g., compiling Javascript). In some embodiments, the file serving process module 420 may compile and/or render the file to share a snapshot (e.g., screenshot) of the web application associated with the file. If the sender 430A selects the dynamic version of the file, the file serving process module 420 may perform a full installation the file.

Notification module 416 may transmit, by the messaging application, a notification comprising a uniform resource locator associated with the server (e.g., remote server 420) derived from the file identifier. In some embodiments, the URL is a host address and the identifier of the file. The host address references the host on which the file serving process is running.

Figure 5:
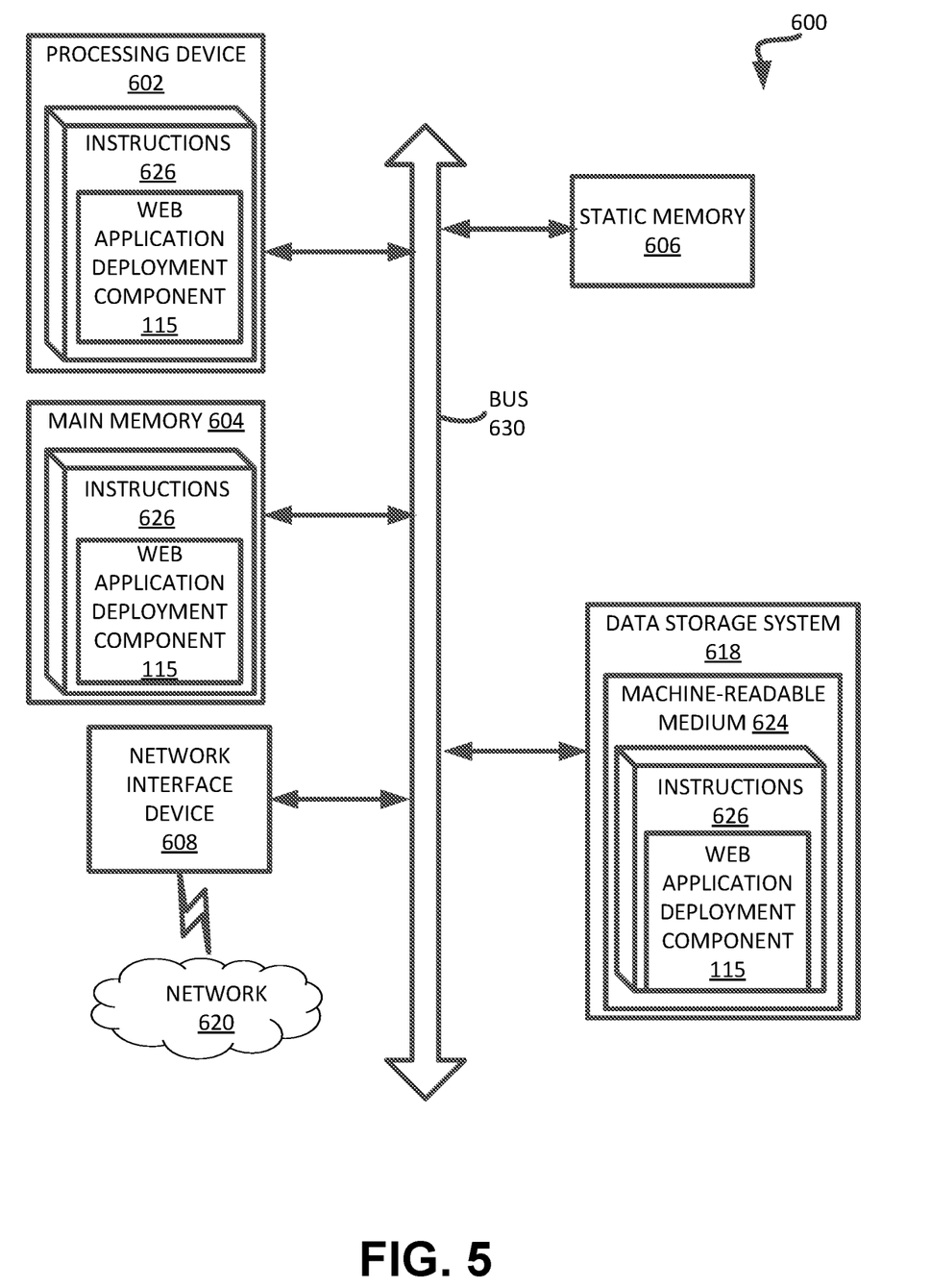
FIG. 5 depicts a block diagram of an illustrative computing device operating in accordance with the examples of the present disclosure.

FIG. 5 illustrates an example machine of a computer system 600 within which a set of instructions, for causing the machine to perform any one or more of the methodologies discussed herein, can be executed. In some embodiments, the computer system 600 can correspond to an instant messaging server (e.g., the messaging service 110 of FIG. 1) that can be used to perform the operations corresponding to the web application deployment component 115 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to a web application deployment component (e.g., the web application deployment component 115 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device;

a processing device, operatively coupled to the memory device, to perform operations comprising:
receiving, by a messaging application, an identifier of a file residing on a file system of a sender, wherein the file includes data associated with a web application to be shared with a receiver, and wherein the data comprises source code;
deploying, based on the identifier of the file, a server to install the web application; and
responsive to installing the web application on the deployed server, transmitting, by the messaging application, a notification to the receiver comprising a uniform resource locator associated with the server derived from the file identifier.

2. The system of claim 1, wherein the server is a HyperText Transfer Protocol (HTTP) server.

3. The system of claim 1, wherein the file system is one of: a local file system or a remote file system associated with a host computer system.

4. The system of claim 1, wherein deploying the server further comprises at least one of: initializing the server, installing at least one extension package for the server, configuring an access permission by the server to the file, or installing a version of the file.

5. The system of claim 4, wherein initializing the server includes determining whether to initialize the server on one of: a host computer system or the messaging application.

6. The system of claim 4, wherein installing at least one package on the server includes identifying the at least one package by analyzing the file.

7. The system of claim 1, wherein installing the file on the server includes determining, based on a display mode, whether to display a static version of the file or a dynamic version of the file.

8. The system of claim 1, wherein the uniform resource locator comprises a host address and the identifier of the file, and wherein the host address references the host on which the server is running.

9. A method comprising:
receiving, by a messaging application, an identifier of a file residing on a file system of a sender, wherein the file includes data associated with a web application to be shared with a receiver, and wherein the data comprises source code;
deploying, based on the identifier of the file, a server to install the web application; and
responsive to installing the web application on the deployed server, transmitting, by the messaging application, a notification to the receiver comprising a uniform resource locator associated with the server derived from the file identifier.

10. The method of claim 9, wherein the server is a HyperText Transfer Protocol (HTTP) server.

11. The method of claim 9, wherein the file system is one of: a local file system or a remote file system associated with a host computer system.

12. The method of claim 9, wherein deploying the server further comprises at least one of: initializing the server, installing at least one extension package for the server, configuring an access permission by the server to the file, or installing a version of the file.

13. The method of claim 12, wherein initializing the server includes determining whether to initialize the server on one of: a host computer system or the messaging application.

14. The method of claim 12, wherein installing at least one package on the server includes identifying the at least one package by analyzing the file.

15. The method of claim 12, wherein configuring the access permission to the server includes determining, based on the initialized server, whether to grant access to at least one of: the sender or the receiver.

16. The method of claim 9, wherein installing the file on the server includes determining, based on a display mode, whether to display a static version of the file or a dynamic version of the file.

17. The method of claim 9, wherein the uniform resource locator comprises a host address and the identifier of the file, and wherein the host address references the host on which the server is running.

18. A non-transitory machine-readable storage medium including instructions that, when accessed by a processing device, cause the processing device to:
share, by a host computer, an identifier of a file residing on a file system of a sender via a messaging application to at least one receivers, wherein the file includes data associated with a web application in development;
determine a mode to share the file, wherein the mode is one of: a first mode or a second mode;
deploy, based on the determined mode to share, a server to install the web application; and
responsive to installing the web application on the server, transmit, by the messaging application, a notification to the receiver comprising a uniform resource locator associated with the server derived from the file identifier.

19. The non-transitory machine-readable storage medium of claim 18, wherein the determined mode is a first mode and wherein configuring, based on the determined mode to share the server to respond to content requests specifying the file includes initializing a HyperText Transfer Protocol (HTTP) server on the host computer.

20. The non-transitory machine-readable storage medium of claim 18, wherein the determined mode is a second mode and wherein configuring, based on the determined mode to share the server to respond to content requests specifying the file includes initializing a HyperText Transfer Protocol (HTTP) server on the messaging application.

\* \* \* \* \*